April 26, 1966   G. SCHAEFFLER   3,248,155
CYLINDRICAL ROLLER BEARING
Filed Nov. 29, 1963
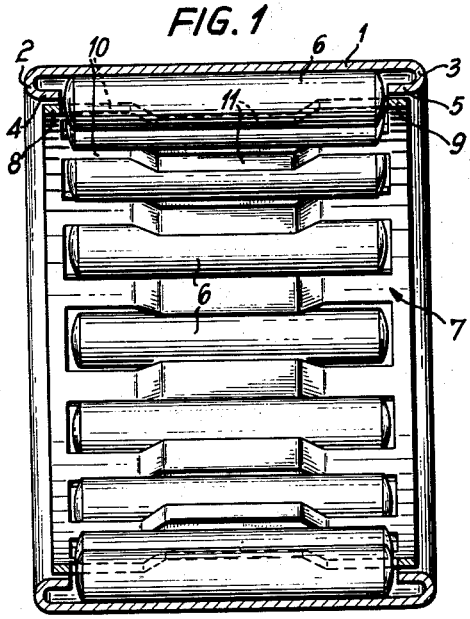
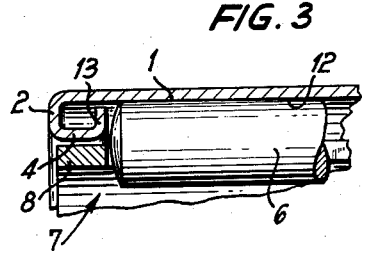
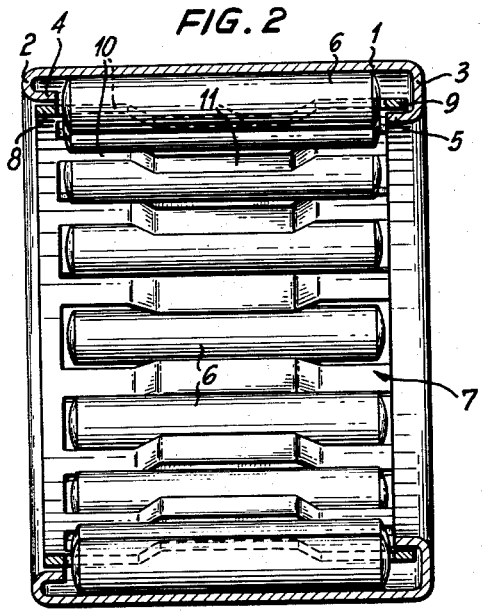
INVENTOR
GEORG SCHAEFFLER
BY
ATTORNEYS

3,248,155
CYLINDRICAL ROLLER BEARING
Georg Schaeffler, Herzogenaurach, near Nurnberg, Germany, assignor to Industriewerk Schaeffler OHG, Herzogenaurach, Germany, a corporation of Germany
Filed Nov. 29, 1963, Ser. No. 326,680
Claims priority, application Germany, Jan. 25, 1963, J 23,051
3 Claims. (Cl. 308—212)

The invention relates to a novel economical, cylindrical roller bearing having a thin-walled outer race with flanges for axial abutment of the roller elements.

Various cylindrical roller bearings with thin-walled races with flanges for axial abutment of the roller elements are known but the known bearings have various defects. In one known type of cylindrical roller bearing, the races are lathed from a solid tubular piece and the flanges for the roller abutment are formed in the same lathing operation. Such races are relatively expensive due to the complex machining operation.

One attempt of the prior art to avoid this complex machining operation comprises lathing and polishing the race from a solid tubular piece and then seating so-called lock rings in grooves in the race in form locking fashion to form the abutment flanges. These races are also relatively expensive due to the additional working steps and it is not always certain that the locking rings will be secure enough to safely absorb the axial forces which occur in the bearing's operation.

In addition to races machined from solid tubular pieces, race rings drawn from sheet metal have been widely used. In this type of race, the flanges for axial roller abutment have been formed without metal cutting operations by flanging the ends of the race. However, when the roller elements are mounted in cages, the second flange of the race cannot be formed until the cage has been introduced into the race. This means that the second flange cannot be hardened at the same time as the rest of the race because the second flange cannot be formed if it has been completely hardened. This causes the unhardened flange to prematurely wear out when the rollers or the cage containing the rollers run along the flange during the operation of the bearing. To subsequently harden the second, unhardened flange is a cumbersome and expensive operation.

Another means of forming roller bearings that has been proposed comprises inserting the cage into the unhardened race, forming the flanges on both ends of the race and then hardening the race and the cage. While this procedure has the advantage that both flanges are hardened, it has the disadvantages that the cage is hardened whether it is desired or not and that treatment of the race surface such as polishing of the race surface after the hardening treatment is impossible.

Another suggestion for making bearings using races drawn from sheet metal comprises forming both flanges of the race prior to the hardening step so low that the internal diameter of flanges is larger than the external diameter of the cage. In this fashion, the cage can then be pushed into the race in an axial direction. This bearing construction is serviceable if the race is machined from a solid tubular piece but it fails when the race is drawn from sheet metal because the axial width of the flange is determined by the thickness of the sheet metal used. This small axial width of the flange is not sufficient to provide an adequate centering surface for the cage and has the further disadvantage that the outside support rings of the cage which must be wide enough to guarantee the desired stiffness of the cage extends axially beyond the flanges of the race. This has the disadvantages that the cage may be damaged under certain circumstances by merely pressing the bearing into a bore hole and that the use of the bearing is limited since in many installations there is not enough available space adjacent to the flanges into which the support rings of the cage may extend.

To overcome these disadvantages the axial width of the flanges has been enlarged by inserting additional discs along the inside of the flanges. While the additional discs do create a sufficient centering surface for the cage, this construction requires additional parts which complicate the manufacture and assembly of the bearing and consequently increase the cost of the bearing. While many attempts have been made to create an economical cylindrical roller bearing with a thin walled race having bilateral flanges for axial abutment of roller elements held in a cage, no satisfactory solution was found prior to the present invention.

It is an object of the invention to provide a novel economical, cylindrical roller bearing having a thin walled race with flanges for axial abutment of the roller elements held in a cage.

It is another object of the invention to provide a novel economical, cylindrical roller bearing having a thin-walled race with bilateral flanges whose inner diameter is greater than the diameter of the support rings of the cage.

These and other objects and advantages of the invention will become obvious from the following detailed description.

The cylindrical roller bearing of the invention is comprised of a hardened, thin-walled race with radially directed flanges at both ends which in turn have axially oppositely extending flanges for abutment of the roller elements, and a plurality of roller elements in a window cage, the inner diameter of at least one of the said axial flanges being larger than the diameter of the support rings of the cage.

The bearing of the invention has great advantages over the bearings of known construction. Since at least one of the axially oppositely extending flanges has an inner diameter greater than the diameter of the support rings of the cage, the roller element cage is easily introduced into the race in an axial direction after hardening of the outer race and the roller elements can then be resiliently mounted into the pockets of the cage. Since the width or inner diameter of the flanges on the race can be selected in accordance with the particular requirements of the bearing structure, there is no difficulty in providing a sufficiently broad centering surface for the cage.

According to a variation of the invention, the abutment flanges may be constructed so that the two axially oppositely extending flanges are provided at the ends facing each other with annular flanges extending in the direction of the bearing surface of the outer race. This embodiment is particularly advantageous when the roller elements have to withstand substantial axial forces. Also, the addition of annular flanges provides better surfaces for abutment of the end surfaces of the roller elements.

There are two basic possibilities for the structure of the abutment flanges of the outer race. In one structure, the inner diameter or width of both the axially oppositely extending flanges is greater than the diameter of the support rings of the cage. In the second structure, the axially oppositely extending flanges have different diameters or widths so that one of the axial ends of the cage lie on one side within the flange of the race and the other axial end of the cage lies outside the flange. In both instances, the cage may be centered on the flanges of the race.

Referring now to the drawings:

FIG. 1 is a cross-section of a bearing of the invention in which the width of the axially oppositely extending flanges is greater than the width of the support rings of the cage.

FIG. 2 is a cross-section of a bearing of the invention in which the axially oppositely extending flanges have different widths.

FIG. 3 is a partial cross-section of a bearing of the invention illustrating the annular flange.

According to the embodiment of FIG. 1, the race is comprised of a cylindrical housing 1 which is provided at each end with radial flanges 2 and 3 extending toward the center which in turn change into axially oppositely extending flanges 4 and 5 which have the same inner diameter or width. The roller elements 6 are mounted in cage 7 whose support rings 8 and 9 lie within the space between flanges 4 and 5, respectively. The cage 7 is centered along the surfaces of its support rings 8 and 9 and of flanges 4 and 5 which face each other. The roller elements 6 are resiliently mounted in the cage after the cage is in place. This is possible since the cross bars 10 connecting the support rings 8 and 9 of the cage are offset toward the center along their center portion 11.

The bearing illustrated in FIG. 2 differs from the bearing of FIG. 1 only in that flange 3 is widened whereby the flange 5 no longer lies outside support ring 9 but instead lies inside the said support ring. The cage is also centered in this bearing along the surfaces of support rings 8 and 9 of the cage and of flanges 4 and 5 which face each other.

FIG. 3 illustrates a portion of a bearing which differs from the bearings of FIGS. 1 and 2 in that flange 4 changes over into annular flange 13 extending toward the surface 12 or race 1. This annular flange provides a particularly favorable abutment surface for the end surfaces of the roller elements 6. Flange 5 at the other end of race 1 may also be provided with annular flanges in the same manner.

Various changes in the bearings of the invention such as minor deviations in radial or axial directions necessitated by manufacturing or structural requirements may be made without departing from the spirit or scope thereof and it is to be understood that the invention is to be limited only as defined in the appended claims.

I claim:

1. Cylindrical roller bearings comprising a hardened, thin-walled race with radially directed flanges at both ends which flanges in turn have axially oppositely extending inwardly directed flanges for abutment of the roller elements and a plurality of roller elements in a window cage, the axially directed flanges having different diameters whereby one support ring of the cage lies inside a flange and the other support ring of the cage lies outside a flange.

2. The bearings of claim 1 wherein the cage is centered along the flanges of the race.

3. The bearings of claim 1 wherein the axially oppositely extending flange which lies outside of the cage is provided at its end facing the other flange with an annular flange directed toward the bearing surface of the race.

References Cited by the Examiner

UNITED STATES PATENTS 2,894,791   7/1959   White et al. _____ 308—217

DON A. WAITE, *Primary Examiner.*